(12) United States Patent
Bagwell

(10) Patent No.: US 11,343,686 B2
(45) Date of Patent: May 24, 2022

(54) SYSTEMS AND METHODS FOR CALL SESSION CONTROL FUNCTION FAILOVER USING DYNAMIC ROUTING TECHNIQUES

(71) Applicant: Verizon Patent and Licensing Inc., Arlington, VA (US)

(72) Inventor: Myron Eugene Bagwell, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 56 days.

(21) Appl. No.: 16/815,334

(22) Filed: Mar. 11, 2020

(65) Prior Publication Data
US 2021/0289371 A1 Sep. 16, 2021

(51) Int. Cl.
| | | |
|---|---|---|
| *H04W 24/04* | (2009.01) | |
| *H04L 65/1046* | (2022.01) | |
| *H04L 65/1016* | (2022.01) | |
| *H04L 41/0668* | (2022.01) | |
| *H04L 45/028* | (2022.01) | |
| *H04L 43/16* | (2022.01) | |
| *H04L 65/10* | (2022.01) | |
| *H04L 43/0817* | (2022.01) | |
| *H04L 65/1069* | (2022.01) | |

(52) U.S. Cl.
CPC ......... *H04W 24/04* (2013.01); *H04L 41/0668* (2013.01); *H04L 43/0817* (2013.01); *H04L 43/16* (2013.01); *H04L 45/028* (2013.01); *H04L 65/1006* (2013.01); *H04L 65/1016* (2013.01); *H04L 65/1046* (2013.01); *H04L 65/1069* (2013.01)

(58) Field of Classification Search
CPC .............. H04W 24/04; H04L 65/1006; H04L 65/1046; H04L 43/0817; H04L 45/028; H04L 43/16; H04L 41/0668; H04L 65/1069; H04L 65/1016
See application file for complete search history.

(56) References Cited

U.S. PATENT DOCUMENTS

| | | | | |
|---|---|---|---|---|
| 2009/0129296 A1* | 5/2009 | Grinshpun | .......... | H04L 65/1083 370/261 |
| 2009/0168758 A1* | 7/2009 | Apelqvist | ............. | H04L 65/104 370/352 |

(Continued)

OTHER PUBLICATIONS

Y. Rekhter et al., "A Border Gateway Protocol 4 (BGP-4)," Network Working Group Request for Comments 4271, Jan. 2006.

(Continued)

*Primary Examiner* — Fahmida S Chowdhury

(57) ABSTRACT

A system described herein may provide a technique for the seamless failover of devices in a network, such as a wireless telecommunications network. For example, embodiments may identify a particular device, such as a Call Session Control Function ("CSCF"), that has failed or that does not meet particular performance metrics. An Internet Protocol ("IP") address of the failed device may be assigned to a functioning device of the same type (e.g., another CSCF). The functioning device may be instructed, in accordance with some embodiments, to output routes between itself and other devices or IP addresses, based on which traffic originally intended for the failed device may be routed to the functioning device.

20 Claims, 8 Drawing Sheets

(56) References Cited

U.S. PATENT DOCUMENTS

| | | | | |
|---|---|---|---|---|
| 2011/0128843 A1* | 6/2011 | Przybysz | ................ | H04L 43/50 |
| | | | | 370/216 |
| 2012/0163184 A1* | 6/2012 | Choi | .................. | H04L 65/1069 |
| | | | | 370/241 |
| 2013/0286860 A1* | 10/2013 | Dorenbosch | .......... | H04W 24/06 |
| | | | | 370/252 |
| 2015/0208450 A1* | 7/2015 | Mademann | ......... | H04L 65/1006 |
| | | | | 370/329 |
| 2017/0085455 A1* | 3/2017 | Chiang | ................ | H04L 61/305 |
| 2018/0241784 A1* | 8/2018 | Hallenst | .............. | H04W 12/062 |
| 2019/0036982 A1* | 1/2019 | Li | ...................... | H04L 65/1016 |
| 2020/0153874 A1* | 5/2020 | Christopher | ........ | H04L 65/1016 |
| 2021/0037586 A1* | 2/2021 | Foti | .................... | H04W 36/305 |

OTHER PUBLICATIONS

Q. Vohra et al., "BGP Support for Four-Octet Autonomous System (AS) Number Space," Internet Engineering Task Force (IETF) Request for Comments 6793, Dec. 2012.

* cited by examiner

US 11,343,686 B2

SYSTEMS AND METHODS FOR CALL SESSION CONTROL FUNCTION FAILOVER USING DYNAMIC ROUTING TECHNIQUES

BACKGROUND

A wireless network may include geographically distributed Packet Data Network ("PDN") Gateway ("PGWs"), which may provide an interface between elements of the wireless network and external networks, such as the Internet. A PGW may also serve as a proxy between a User Equipment ("UE"), such as a mobile telephone, and a Call Session Control Function ("CSCF"), during a registration process between the UE and the CSCF. The registration process may include assigning one or more CSCFs to serve the UE. Once registered, CSCFs may assist with call setup or other services provided to the UE.

DETAILED DESCRIPTION OF THE PREFERRED EMBODIMENTS

The following detailed description refers to the accompanying drawings. The same reference numbers in different drawings may identify the same or similar elements.

Embodiments described herein provide for the selection of a set of CSCFs to provide services (e.g., services associated with an IP Multimedia Subsystem ("IMS") network, such as voice call setup services) to a UE, in a manner that is based on the location of the UE. Specifically, for example, in situations where a network device, such as a PGW, a User Plane Function ("UPF"), and/or some other device or system, acts as a proxy for the UE during CSCF selection, the location of the PGW, UPF, etc. may be used to select one or more CSCFs that are geographically proximate to the PGW, UPF, etc. The PGW, UPF, etc. may have been selected, from a pool of geographically distributed PGWs, UPFs, etc., based on proximity to the UE. In this manner, the selection of the CSCFs for the UE may be ultimately be based on the location of the UE.

Further, embodiments described herein provide for the seamless failover of CSCFs or other devices or systems that have been selected to provide services to the UE. For example, while an initial CSCF assignment or provisioning process may include assigning multiple CSCFs, including secondary or tertiary CSCFs (e.g., in accordance with a Local-Local-Remote ("LLR") selection scheme), some UEs may not include the capability of communicating with secondary or tertiary CSCFs without being powered down and restarted. For example, some UEs may include a stub resolver or some other type of function that may not be able to easily switch to communications with a secondary CSCF, in the event that a primary CSCF fails or is otherwise unreachable. As described herein, dynamic routing techniques (e.g., Border Gateway Protocol ("BGP"), and/or some other suitable routing technique) may be utilized to effect a seamless failover, in accordance with some embodiments.

Figure 1:
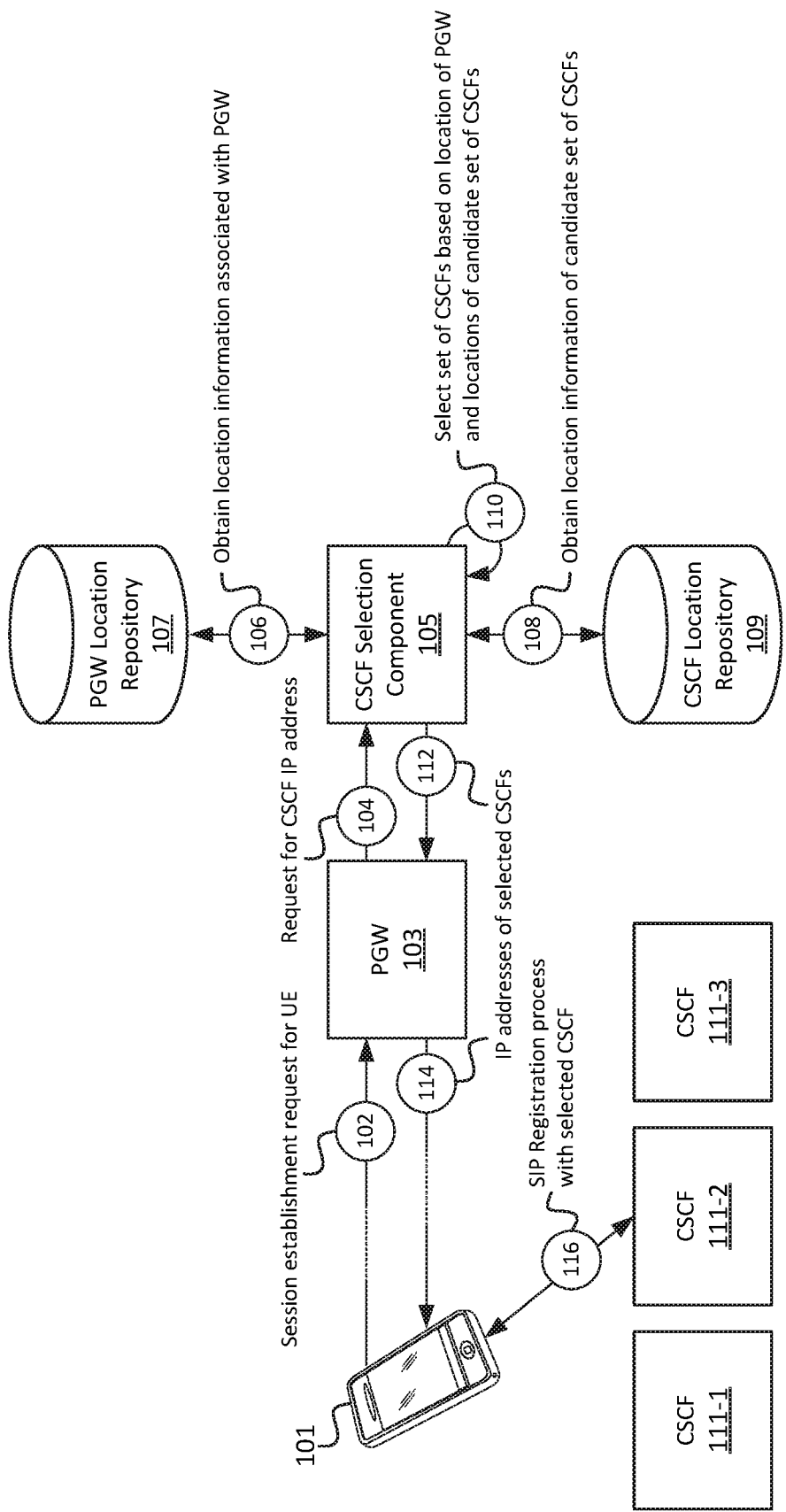
FIGS. 1 and 2 illustrate an assignment of one or more CSCFs for UEs based on location.

As shown in FIG. 1, a session establishment request, associated with UE 101, may be received (at 102) by PGW 103. As denoted by the dashed line between UE 101 and PGW 103 in the figure, this request may be received from one or more intervening devices, such as a Mobility Management Entity ("MME") and/or a Serving Gateway ("SGW") of a wireless network (e.g., an Evolved Packet Core ("EPC") network). While not described in detail here, this request may be received after UE 101 performs a Radio Resource Control ("RRC") establishment procedure with a base station (e.g., an evolved Node B ("eNB")) of a radio access network ("RAN") (e.g., a Long-Term Evolution ("LTE") RAN). Further, while described in the context of a LTE RAN and/or an EPC, similar concepts may apply in other types of networks that utilize IP messaging (e.g., a Fifth Generation ("5G") core). For example, when a PGW network is discussed herein, similar concepts may apply to a UPF of a 5G core network. Similarly, when a MME is discussed herein, similar concepts may apply to an Access and Mobility Management Function ("AMF") or some other suitable device or system of a 5G core network.

As one example of the session establishment procedure shown in FIG. 1, the UE may output a PDN Connectivity Request, based on which the MME may output (e.g., via the SGW) a Create Default Bearer Request to PGW 103. Some or all of these messages may be referred to in FIG. 1 as "session establishment request" 102. PGW 103 may have been selected (e.g., from a pool of candidate PGWs that are geographically distributed) by the MME (e.g., based on a location of UE 101) and/or by one or more other elements of the EPC.

Based on receiving the request to establish a session (e.g., a PDN Connectivity Request) for UE 101, PGW 103 may output (at 104) a request for one or more IP addresses of one or more CSCFs to provide services to UE 101. For example, PGW 103 may output the request to CSCF Selection Component 105. The request may be sent using the Diameter protocol, and/or some other suitable type of messaging. In some embodiments, the request (sent by PGW 103 at 104) may include an IP address and/or some other identifier of PGW 103. In some embodiments, CSCF Selection Component 105 may include Domain Name System ("DNS") functionality, and/or may be communicatively coupled to a DNS component (not shown). For example, CSCF Selection Component 105 may receive and/or maintain records (e.g., DNS records) that correlate CSCFs to IP addresses.

As further shown, CSCF Selection Component 105 may maintain or receive (at 106) location information, associated with PGW 103 and/or one or more other PGWs associated with the EPC, from PGW Location Repository 107. PGW Location Repository 107 may be a device associated with the EPC, and/or may be communicatively coupled to one or more devices of the EPC. In some embodiments, CSCF Selection Component 105 and PGW Location Repository 107 may be implemented by the same device or system. The location information (received at 106) may include a mapping between IP addresses (or other identifiers) of PGWs to the locations at which the PGWs are located. Based on the information received from PGW Location Repository 107, CSCF Selection Component 105 may identify the location of PGW 103 (e.g., by using the IP address or other identifier of PGW 103 to identify the corresponding location of PGW 103).

Further, CSCF Selection Component 105 may maintain or receive (at 108) location information, associated with a set of CSCFs (e.g., candidate CSCFs, from which one or more CSCFs may be selected to serve UE 101), from CSCF Location Repository 109. CSCF Location Repository 109 may be a device associated with the EPC, and/or may be communicatively coupled to one or more devices of the EPC. In some embodiments, CSCF Selection Component 105 and CSCF Location Repository 109 may be implemented by the same device or system. The location information received (at 108) from CSCF Location Repository 109 may indicate, on a per-CSCF basis, a geographical location associated with each CSCF of the set of candidate CSCFs. The location information may, in some embodiments, be expressed as coordinates (e.g., longitude and latitude) or in some other similar manner. In some embodiments, the location information may be expressed in terms of a data center or facility in which the CSCFs are physically located. CSCF Selection Component 105 may also receive information indicating location information for various data centers or facilities, based on which CSCF Selection Component 105 may ultimately determine the locations of the candidate CSCFs.

While discussed herein in the context of CSCFs 111, in practice, similar concepts may apply for other devices or systems that are selected to provide services or communications associated with UE 101. For example, similar concepts may apply for a Home Subscriber Server ("HSS"), Unified Data Management function ("UDM"), etc. For example, a HSS or UDM may be selected based on a location of UE 101, PGW 103, etc.

CSCF Selection Component 105 may select (at 110) one or more CSCFs based on the determined location of PGW 103. For example, assume that the location information associated with the candidate set of CSCFs (received at 108) includes location information for example CSCFs 111-1, 111-2, and 111-3 (hereinafter referred to individually as "CSCF 111" or collectively as "CSCFs 111"). In this example, assume that CSCF Selection Component 105 determines that CSCF 111-2 is located most geographically proximate to PGW 103, from the candidate set of CSCFs that includes CSCFs 111-1, 111-2, and 111-3. Thus, in this example, CSCF Selection Component 105 may select (at 110) CSCF 111-2 to serve UE 101, and may not select CSCFs 111-1 or 111-3.

While shown as the selection of one particular CSCF 111, in practice, CSCF Selection Component 105 may select (at 110) multiple CSCFs 111 to serve UE 101. For example, as discussed above, CSCFs 111 may be located in data centers or facilities, in which multiple CSCFs 111 may be located. Thus, in some embodiments, CSCF Selection Component 105 may select multiple CSCFs 111 (e.g., co-located CSCFs 111) to serve UE 101, where one CSCF 111 is designated as a "primary" CSCF, and one or more other CSCFs 111 are designated as "secondary," "tertiary," "auxiliary," etc. CSCFs. In some embodiments, using a LLR selection technique, two co-located CSCFs may be selected as primary and secondary CSCFs (e.g., two CSCFs located in the same data center), and a CSCF located in a different location (e.g., located in a different data center) may be selected as a tertiary CSCF.

In some embodiments, UE 101 may be configured to communicate or register with a primary CSCF 111, and communicate with a secondary or tertiary CSCF in the event of a failure of the primary CSCF 111. However, as mentioned above, some UEs 101 may not include suitable functionality to communicate with a secondary or tertiary CSCF in the event of failure of the primary CSCF 111. As discussed below, the IP address of the primary CSCF 111 may be reassigned to a different CSCF 111 if the primary CSCF 111 fails, thus eliminating the need for UE 101 to reestablish communications with the secondary or tertiary CSCF 111.

Once CSCF Selection Component 105 has selected a particular CSCF 111 (or set of CSCFs 111) for UE 101, CSCF Selection Component 105 may provide (at 112), to PGW 103, an indication of the IP address (or addresses) of the selected CSCF(s) 111. For example, the indication (sent at 112) may include a DNS response (e.g., a Resource Record Response). In some embodiments, this message may be sent using the Diameter protocol and/or some other suitable type of message. PGW 103 may accordingly output (at 114) the IP address (or addresses) of the selected CSCF(s) 111. While shown in the figure as being sent to UE 101, the dashed line 114 may indicate one or more messages sent by one or more intervening devices. For example, PGW 103 may output a Create Default Bearer Response to a SGW, which may forward the Create Default Bearer Response (or other suitable message) to a MME associated with UE 101. The MME may create or activate one or more bearers (e.g., an Evolved Packet System ("EPS") Bearer) based on receiving the Create Default Bearer Response (and/or based on one or more other messages not discussed in detail here for the sake of brevity). As part of this bearer establishment process, the IP address(es) of the selected CSCF(s) 111 may be provided (at 114) to UE 101.

Based on receiving the IP address(es) of the selected CSCF(s) 111, including the IP address of CSCF 111-2, UE 101 may communicate with CSCF 111-2 (e.g., where CSCF 111-2 is a primary CSCF of the selected CSCFs 111, in a situation where multiple CSCFs 111 have been selected). UE 101 may thus use the IP address of CSCF 111-2 to communicate with CSCF 111-2, and perform (at 116) a registration process with CSCF 111-2. In some embodiments, the registration process may include a Session Initiation Protocol ("SIP") registration process, based on which CSCF 111-2 may provide services (e.g., voice call services, messaging services, etc.) to UE 101.

Selecting a CSCF based on location, in accordance with some embodiments (e.g., as described above), may reduce the perceived latency in functions such as voice call (e.g., Voice over LTE ("VoLTE") call) setup associated with UE 101. For example, since CSCF 111-2 has been selected based on proximity to PGW 103 (which may have itself been selected based on proximity to UE 101), the communications (e.g., at 116) between UE 101 and CSCF 111-2 may traverse a shorter physical distance than if UE 101 were to communicate with a CSCF 111 that is located farther away from UE 101 (e.g., CSCF 111-1 or 111-3). That is, since such communications may traverse a shorter physical distance, these communications may take less time to reach CSCF 111-2 from UE 101, or vice versa.

Figure 2:
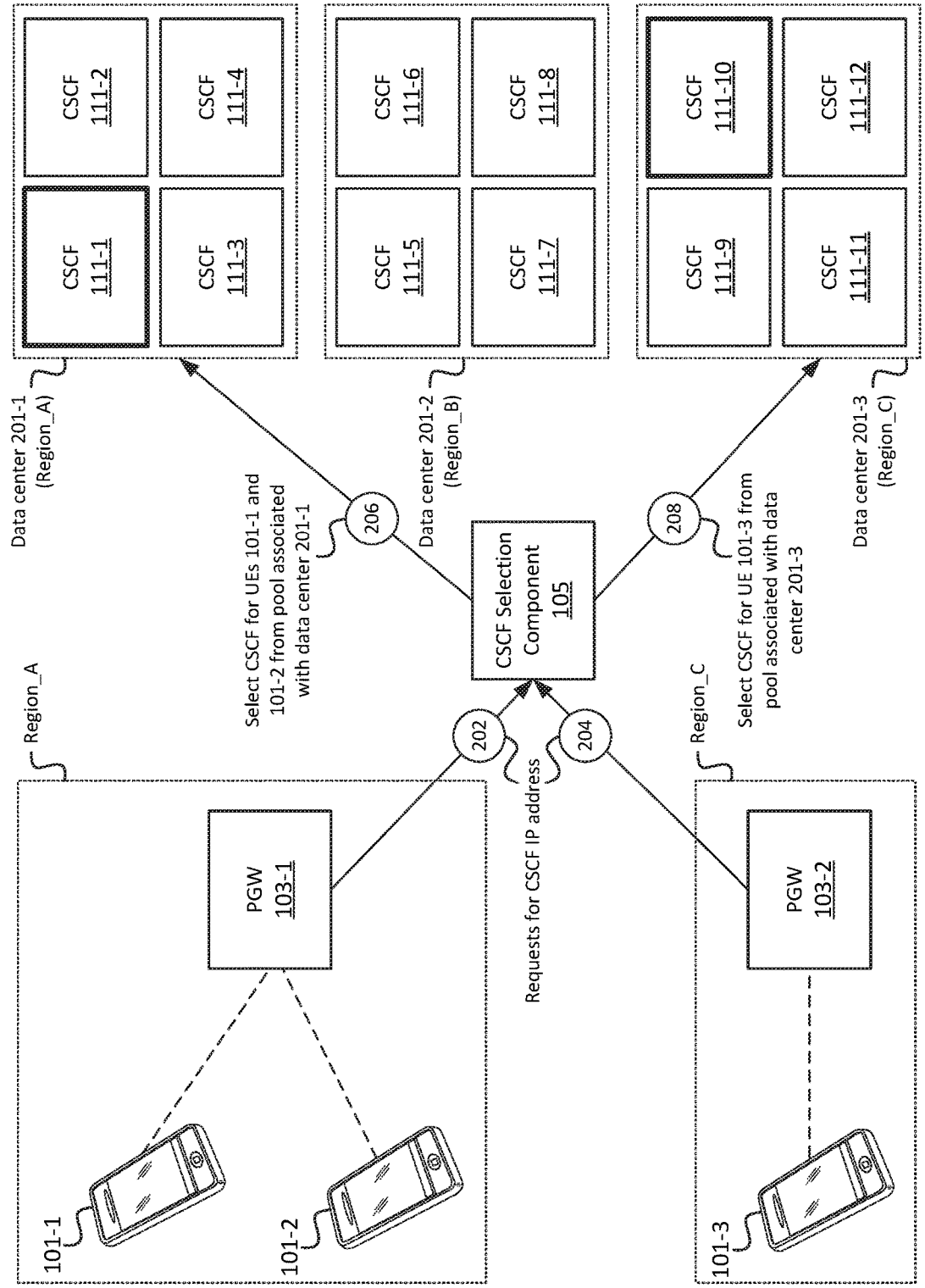

FIG. 2 illustrates some of the concepts described with regard to FIG. 1, in the context of multiple UEs that are located in different locations, and are thus associated with different PGWs 103. For example, as shown, UEs 101-1 and 101-2 may be located in a first geographical region ("Region_A"), while UE 101-3 may be located in a second geographical region ("Region_B"). These different regions may be for example, different cities, states, provinces, tracking areas ("TAs"), and/or some other suitable delineation of regions.

In some embodiments, a "region" may be defined in terms of connectivity to a particular PGW 103. For example, UEs 101 that are considered to be in Region_A may be so considered due to being associated with PGW 103-1, while UEs 101 that are considered to be in Region_B may be so considered due to being associated with PGW 103-2. These "associations" between UEs and PGWs are denoted in the figure by dotted lines between UEs 101 and respective PGWs 103. As discussed above, these dotted lines may reflect, for example, one or more messages or communications between UEs 101, PGWs 103, and/or one or more other devices or systems (e.g., a MME, a SGW, etc.), by which PGW 103-1 is associated with (or assigned to) UEs 101-1 and 101-2, and by which PGW 103-2 is associated with (or assigned to) UE 101-3.

As shown, CSCF Selection Component 105 may receive (at 202) requests for CSCF IP addresses, on behalf of UEs 101-1 and 101-2, from PGW 103-1. That is, as similarly discussed above, PGW 103-1 may act as a proxy for CSCF registration on behalf of UEs 101-1 and 101-2. Although shown as one arrow 202 in the figure, in practice, these requests may include multiple messages sent at different times. As also shown, CSCF Selection Component 105 may receive (at 204) a request for a CSCF IP address (or addresses), on behalf of UE 101-3, from PGW 103-2. These requests (at 202 and 204) may be received, in some embodiments, as Diameter protocol messages.

As further shown, various data centers 201 may be geographically distributed. For example, as shown, data center 201-1 may be a data center that is located in, or is otherwise associated with, Region_A, data center 201-2 may be located in Region_B, and data center 201-3 may be located in Region_C. Data center 201-1 may include a first set of CSCFs (including CSCFs 111-1 through 111-4), data center 201-2 may include a second set of CSCFs (including CSCFs 111-5 through 111-8), and data center 201-3 may include a third set of CSCFs (including CSCFs 111-9 through 111-12). While each example data center 201 is shown here as including four CSCFs 111, in practice, data centers 201 may include additional or fewer CSCFs 111. Further, while each data center 201 is shown here as including the same quantity of CSCFs 111, in practice, different data centers 201 may include different quantities of CSCFs 111.

Based on the requests (received at 202 and 204), CSCF Selection Component 105 may select particular CSCFs for UEs 101-1, 101-2, and 101-3. For example, CSCF Selection Component 105 may select (at 206) a particular CSCF 111 from data center 201-1 to serve UE 101-1 and/or UE 101-2 (e.g., CSCF 111-1, as denoted by the bold line in the figure). For example, as similarly discussed above, CSCF Selection Component 105 may identify, based on an IP address (or other identifier) associated with PGW 103-1, as well as information that maps PGW IP addresses to regions, that CSCFs 111 from data center 201-1 should be selected for UEs 101-1 and/or 101-2 (e.g., as opposed to CSCFs 111 from data center 201-2 or data center 201-3, associated with different regions). Additionally, or alternatively, CSCF Selection Component 105 may indicate (at 206) to a controller or other device or system associated with data center 201-1 that a particular CSCF 111 should be selected, and the controller associated with data center 201-1 may select CSCF 111-1 (e.g., from the set of CSCFs that includes CSCFs 111-1 through 111-4). Similarly, CSCF Selection Component 105 may select (at 208) a particular CSCF (e.g., CSCF 111-10, in this example) to serve UE 101-3.

As similarly described above, once CSCF Selection Component 105 selects (at 206 and 208) CSCFs 111 to serve UEs 101-1, 101-2, and/or 101-3, CSCF Selection Component 105 may provide the IP addresses associated with the selected CSCFs 111 to respective UEs 101-1, 101-2, and/or 101-3 (e.g., via an MME, an SGW, and/or some other device or system). UEs 101-1, 101-2, and 101-3 may thus utilize these IP addresses to communicate with respective CSCFs 111, in order to perform call setup and/or other procedures (e.g., using SIP messaging and/or some other suitable protocol).

Figure 3:
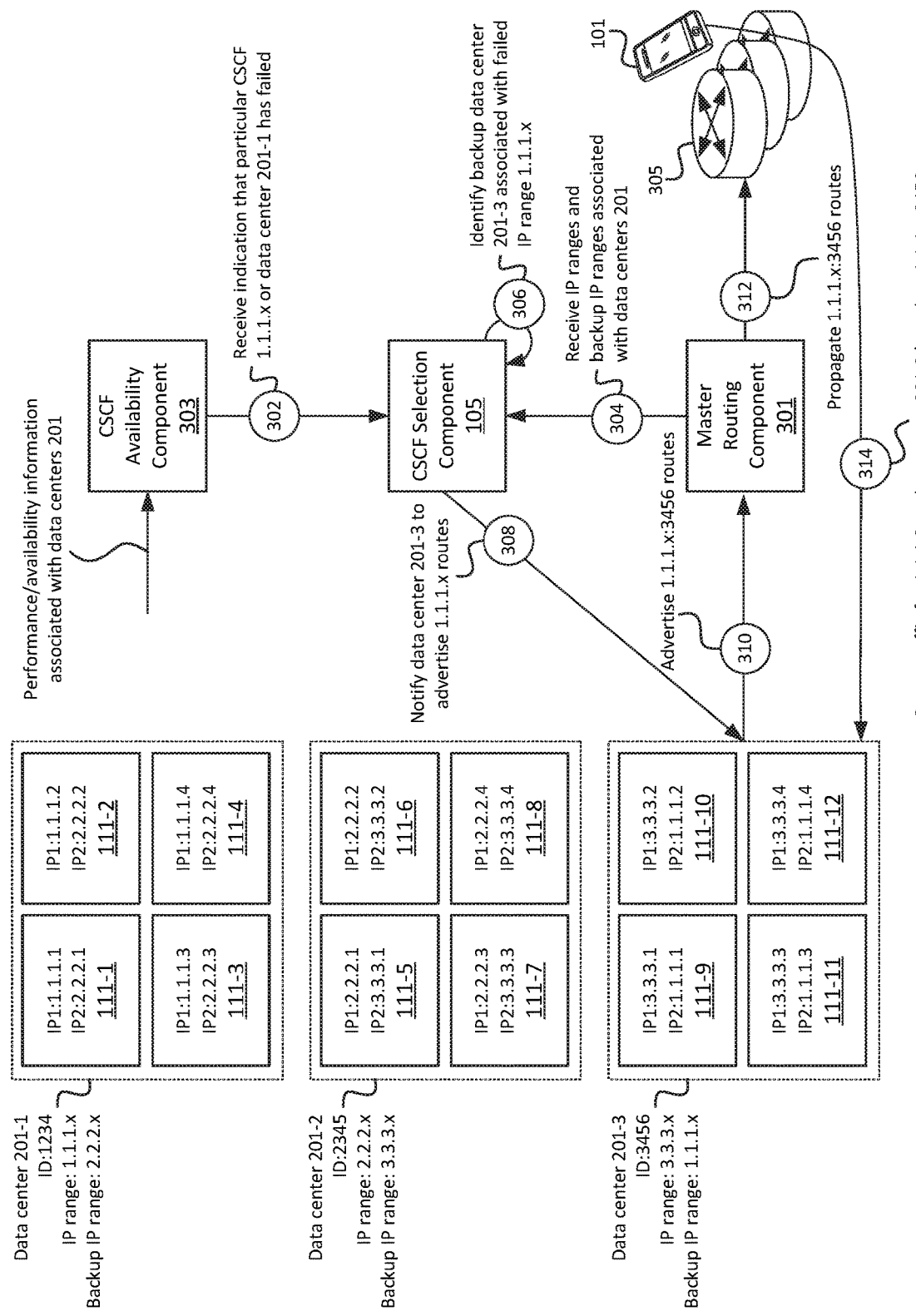
FIG. 3 illustrates an example reassignment of an Internet Protocol ("IP") address associated with a failed CSCF, in order to effect a seamless failover of the failed CSCF to a functioning CSCF.

As shown in FIG. 3, data centers 201 may each be associated with an identifier ("ID"), an IP address range, and a backup IP address range. The ID for each data center 201 may be an identifier used in a dynamic routing technique, such as an Autonomous System Number ("ASN") used in a BGP routing technique. The ID may, in some embodiments, be used in accordance with the routing technique to define paths between different elements (e.g., where each element may be referred to as an Autonomous System ("AS"), which is associated with its own unique ASN, in some embodiments). The routing technique may also include a mapping or other correlation of IP addresses, or IP address ranges, to ASNs or other IDs.

For example, as shown here, CSCFs 111-1 through 111-4, associated with data center 201-1, may have IP addresses beginning with "1.1.1" (denoted in the figure as "1.1.1.x"). While IP address ranges are sometimes discussed herein using a "1.1.1.x" notation, similar concepts may apply using different notations for IP address ranges (e.g., "1.1.1.0-1.1.1.255", "1.1.1.0/24," or other suitable notations). As further shown, CSCFs 111-1 through 111-4, associated with data center 201-1, may have backup IP addresses in the "2.2.2.x" range. For example, during an initial provisioning process, and/or during an IP address reassignment process, CSCFs 111-1 through 111-4 may have been assigned both a primary IP address (e.g., in the "1.1.1.x" range) and a backup IP address (e.g., in the "2.2.2.x" range). In some embodiments, a controller, router, etc. associated with data center 201-1 may maintain information associating each CSCF 111 with a particular primary and backup IP address. As further discussed below, Master Routing Component 301 and/or some other device or system may additionally, or alternatively, maintain information mapping IDs (e.g., ASNs) to IP addresses or IP address ranges.

In some embodiments, each particular data center 201 may include a component or function associated with a particular routing technique (e.g., a BGP component), which advertises routes between particular source IP addresses (or IP address ranges) and the IP addresses associated with particular data center 201. For example, data center 201-1 may advertise routes from IP addresses (e.g., associated with UEs 101 or groups of UEs 101) to IP addresses in the "1.1.1.x" range. The routes may, in some embodiments, be expressed in terms of ASNs or other suitable identifiers.

As described herein, each data center 201 may advertise routes associated with its primary IP address range unless otherwise instructed. For example, data center 201-1 may advertise routes to the IP address range "1.1.1.x", data center 201-2 may advertise routes to the IP address range "2.2.2.x", and data center 201-3 may advertise routes to the IP address range "3.3.3.x". The advertisements from various elements associated with the dynamic routing technique (e.g., BGP advertisements by data centers 201) may be received by Master Routing Component 301 and/or other elements that implement the dynamic routing technique (e.g., routers associated with a core or another portion of a wireless network). In some embodiments, Master Routing Component 301 may broadcast and/or otherwise propagate routing information, based on the advertised routes, to other elements that implement the dynamic routing technique. In this manner, each element that implements the dynamic routing technique may be "aware" of the topology of the network according to the routing technique, and/or of the routes that involve the particular elements. In some embodiments, Master Routing Component 301 may be, or may include, a BGP route reflector or other suitable component.

As shown in FIG. 3, CSCF Availability Component 303 may be communicatively coupled to one or more data centers 201, and/or to one or more CSCFs 111 associated with data centers 201. These communications are illustrated in FIG. 3 as a single arrow at CSCF Availability Component 303. In practice, multiple connections, sessions, interfaces, etc. may be present between CSCF Availability Component 303 and one or more data centers 201. Additionally, or alternatively, CSCF Availability Component 303 may receive information regarding data centers 201 and/or CSCFs 111 from some other source.

Based on communications with, or regarding data centers 201 and/or CSCFs 111, CSCF Availability Component 303 may determine availability or performance associated with one or more data centers 201 or CSCFs 111. CSCF Availability Component 303 may, for instance, communicate with CSCFs 111 using polling, ping messages, and/or other suitable types of communications in order to determine whether CSCFs 111 are functioning or have failed. Additionally, or alternatively, CSCF Availability Component 303 may communicate with data centers 201 (e.g., with controllers, routers, etc. associated with data centers 201), to determine performance or availability of data centers 201.

For example, if CSCF Availability Component 303 sends a series of messages to data center 201-1 (e.g., to a controller, router, etc. associated with data center 201-1) and does not receive a response (e.g., within a threshold time), CSCF Availability Component 303 may determine that data center 201-1, and/or CSCFs 111-1 through 111-4 (e.g., the particular CSCFs 111 associated with data center 201-1) have failed. As another example, CSCF Availability Component 303 may utilize similar messaging (or some other suitable technique) to determine performance or link quality metrics such as latency, throughput, jitter, packet loss, packet error rate, etc. If these metrics (e.g., individually, or in combination, in some embodiments) are below a threshold, CSCF Availability Component 303 may determine that data center 201-1 and/or CSCFs 111-1 through 111-4 have failed.

In this example, CSCF Availability Component 303 may determine that data center 201-1 (and/or one or more CSCFs 111 associated with data center 201-1) has failed. Based on determining that data center 201-1 has failed, CSCF Availability Component 303 may output (at 302) an indication (e.g., to CSCF Selection Component 105) that data center 201-1 has failed. In some embodiments, CSCF Selection Component 105 may also maintain information indicating the IP address ranges (e.g., the primary and backup IP address ranges) associated with data center 201-1. For example, CSCF Selection Component 105 may receive (at 304) the information indicating the IP address ranges associated with data center 201-1, data center 201-2, and/or data center 201-3. In some embodiments, CSCF Selection Component 105 may receive (at 304) this information after receiving (at 302) the indication that data center 201-1 has failed, or prior to receiving the indication that data center 201-1 has failed. For example, CSCF Selection Component 105 may implement the same dynamic routing protocol as Master Routing Component 301, and may thus receive routing updates propagated by Master Routing Component 301. Additionally, or alternatively, Master Routing Component 301 may periodically or intermittently provide updated routing information to CSCF Selection Component 105. In some embodiments, Master Routing Component 301 and CSCF Selection Component 105 may be implemented by the same device or system.

Based on receiving the indication that data center 201-1 has failed, and further based on the routing information received from Master Routing Component 301, CSCF Selection Component 105 may identify the IP address ranges (e.g., the primary IP address range) associated with data center 201-1 (e.g., the range "1.1.1.x" in this example), and may further identify (at 306) that a backup IP address range of data center 201-3 is the same IP address range as the primary IP address range of data center 201-1. That is, the information (received from Master Routing Component 301) may indicate that a backup IP address range of data center 201-3 is "1.1.1.x". In other words, CSCF Selection Component 105 may determine that the IP address range "1.1.1.x" should be reassigned to data center 201-3, in lieu of data center 201-1. Thus, for example, the IP address 1.1.1.3, previously associated with CSCF 111-3, may be reassigned to CSCF 111-11. In this manner, as one example, CSCF 111-11 may be selected to provide services (e.g., call setup services, messaging services, etc.) previously provided by CSCF 111-3.

CSCF Selection Component 105 may notify (at 308) data center 201-3 that the backup IP address range associated with data center 201-3 should be activated. For example, CSCF Selection Component 105 may instruct data center 201-3 to advertise routes associated with the IP address range "1.1.1.x". In this manner, data center 201-3 may, after receiving (at 308) the notification or instruction from CSCF Selection Component 105, advertise (at 310) routes associated with both the primary IP address range of "3.3.3.x" as well as the secondary IP address range of "1.1.1.x". The advertisement may be according to the same dynamic routing technique implemented by Master Routing Component 301, such as a BGP advertisement. In some embodiments, the advertisement may include the identifier (e.g., ASN) of data center 201-3 (e.g., shown in figure as "ID:3456").

In some embodiments, CSCF Selection Component 105 may also notify data center 201-1 to stop advertising routes associated with the IP address range "1.1.1.x". For example, in the event that data center 201-1 has failed or performance associated with data center 201-1 has fallen below a threshold level, data center 201-1 may still be reachable by CSCF Selection Component 105. For example, while one or more CSCFs 111 associated with data center 201-1 may have failed, a controller, router, etc. associated with data center 201-1 (e.g., a device or system associated with data center 201-1, that implements the dynamic routing scheme associated with Master Routing Component 301, such as a BGP component) may not have failed. In such instances, CSCF Selection Component 105 may communicate with the controller, router, etc. associated with data center 201-1 to indicate that data center 201-1 should not advertise routes associated with the IP address range "1.1.1.x". In some embodiments, if data center 201-1 is not reachable, CSCF Selection Component 105 (and/or some other device or system) may queue the notification and notify data center 201-1, when data center 201-1 is available, to stop advertising the routes associated with this IP address range. Additionally, or alternatively, if data center 201-1 becomes available after some period of time, CSCF Selection Component 105 may notify data center 201-3 to stop advertising routes associated with the IP address range "1.1.1.x".

This advertisement may be received by Master Routing Component 301 and/or one or more other network elements that implement the particular dynamic routing technique. Master Routing Component 301 may, in some embodiments, propagate (at 312) the advertisement to one or more routers 305 and/or other network elements. For example, routers 305 may be routers associated with a core of a wireless network, and/or some other type of network. Routers 305 may, in this context, include devices or systems that route IP traffic. In some embodiments, one or more routers 305 may also implement the particular routing technique implemented by Master Routing Component 301, and/or may be associated with identifiers (e.g., ASNs) associated with the particular routing technique. As such, routers 305 may use the propagated information, from Master Routing Component 301, to determine how to forward received traffic. For example, routers 305 may use identifiers (e.g., ASNs) indicated in particular paths (e.g., as provided by Master Routing Component 301 and/or as determined by respective routers 305) to forward traffic to (or toward) their destination.

For example, assume that one or more routers 305 receive traffic from UE 101 (e.g., having a source IP address of 4.4.4.1), destined for a particular CSCF 111 (e.g., having a destination IP address of 1.1.1.3). The traffic may include, for example, a SIP message or some other suitable message. Based on the information (received at 312) propagated by Master Routing Component 301, each router 305 may determine an appropriate path for the traffic to its destination. For example, each router 305 may use the routing information (e.g., the paths propagated by Master Routing Component 301) to determine an identifier (e.g., a ASN) of a router 305 or other element to which the traffic should be forwarded, and may forward the traffic to the next router 305 or other element in the path. In this manner, the traffic from UE 101 may ultimately be provided to data center 201-3 (e.g., based on being addressed to an IP address in the "1.1.1.x" IP address range). A controller, router, etc. that is associated with data center 201-3 may further forward the traffic to CSCF 111-11 based on the particular destination IP address (e.g., 1.1.1.3, in this example) of the traffic.

Figure 4:
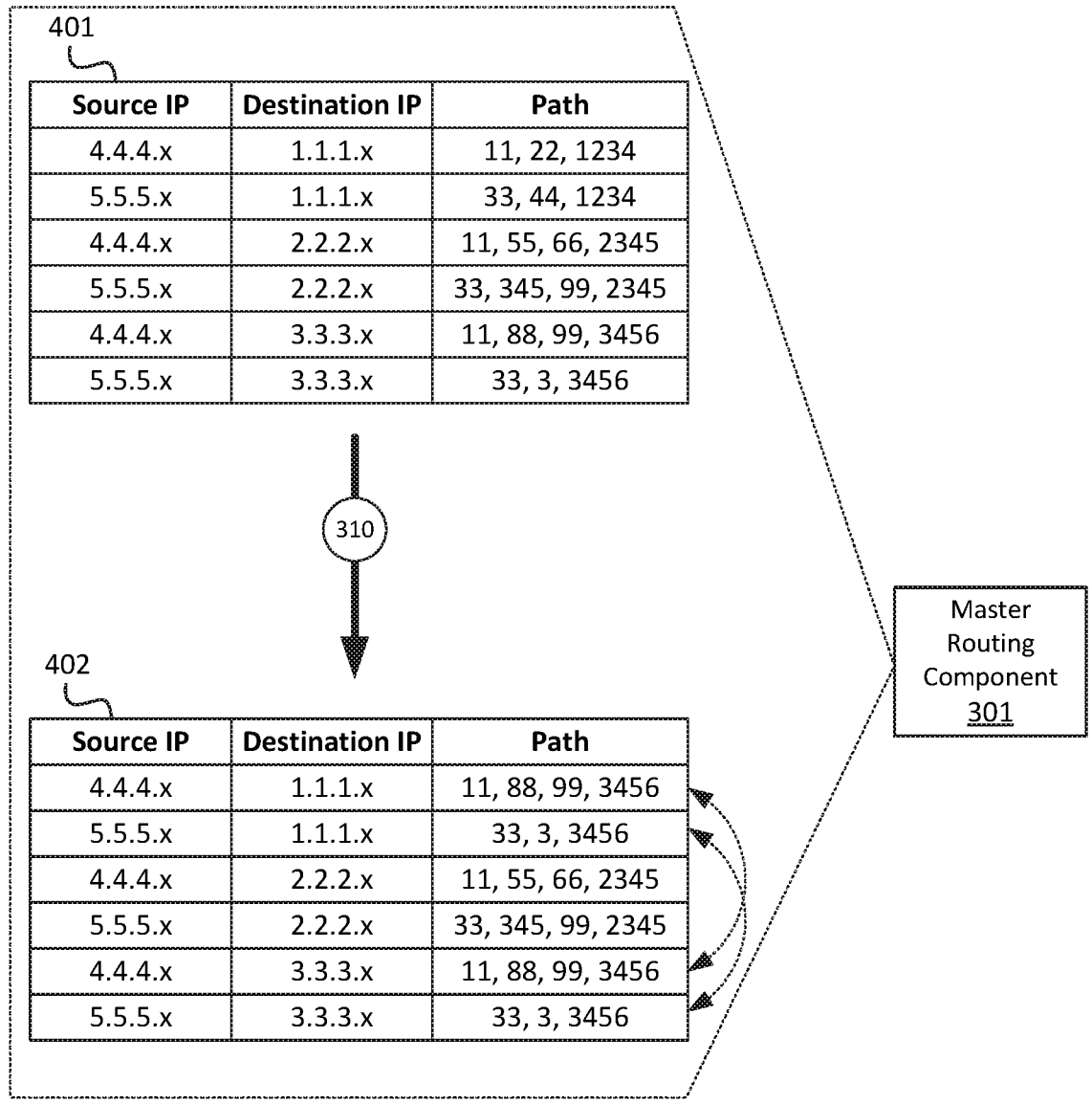
FIG. 4 illustrates an example modification of a data structure that may reflect the reassignment of a reassignment of a failed CSCF to a functioning CSCF, in accordance with some embodiments described herein.

FIG. 4 illustrates an example data structure, which may be maintained or provided by Master Routing Component 301, in accordance with some embodiments. For example, data structure 401 may reflect information maintained or provided by Master Routing Component 301 prior to receiving the advertisement (at 310) of routes associated with the "1.1.1.x" IP address range from data center 201-3, and data structure 402 may reflect information maintained or provided by Master Routing Component 301 after receiving the advertisement (at 310) of routes associated with the "1.1.1.x" IP address range from data center 201-3.

For example, as shown, data structure 401 may include paths for various communication endpoints. In some embodiments, data structure 401 may be, or may include, a routing table (e.g., a BGP routing table). The communication endpoints are expressed here in terms of IP addresses. For example, data structure shows paths between "Source IP" and "Destination IP." In practice, other terminology may be used to reflect similar concepts (e.g., "Network IP" and "Next Hop IP", or other suitable notations). As shown, for example, data structure 401 may indicate that traffic, from IP addresses in the "4.4.4.x" IP address range, to IP addresses in the "1.1.1.x" range should traverse elements (e.g., AS elements) having the identifiers (e.g., ASNs) 11, 22, and 1234. Further, data structure 401 may indicate that traffic, from IP addresses in the "5.5.5.x" IP address range, to IP addresses in the "1.1.1.x" range should traverse elements (e.g., AS elements) having the identifiers (e.g., ASNs) 33, 44, and 1234. Referring to the example shown in FIG. 3, the identifier 1234 may be associated with data center 201-1. Thus, the aforementioned paths indicate data center 201-1 (e.g., based on the identifier 1234) as the endpoint of the indicated paths.

As further shown, data structure 401 may indicate that traffic, from IP addresses in the "4.4.4.x" IP address range, to IP addresses in the "2.2.2.x" range should traverse elements (e.g., AS elements) having the identifiers (e.g., ASNs) 11, 55, 66, and 2345. Further, data structure 401 may indicate that traffic, from IP addresses in the "5.5.5.x" IP address range, to IP addresses in the "2.2.2.x" range should traverse elements (e.g., AS elements) having the identifiers (e.g., ASNs) 33, 345, 99, and 2345. Thus, referring to the example shown in FIG. 3, these paths indicate data center 201-2 (e.g., based on the identifier 2345) as the endpoint of the indicated paths.

Further, data structure 401 may indicate that traffic, from IP addresses in the "4.4.4.x" IP address range, to IP addresses in the "3.3.3.x" range should traverse elements (e.g., AS elements) having the identifiers (e.g., ASNs) 11, 88, 99, and 3456. Further, data structure 401 may indicate that traffic, from IP addresses in the "5.5.5.x" IP address range, to IP addresses in the "3.3.3.x" range should traverse elements (e.g., AS elements) having the identifiers (e.g., ASNs) 33, 3, and 3456. Thus, referring to the example shown in FIG. 3, these paths indicate data center 201-3 (e.g., based on the identifier 3456) as the endpoint of the indicated paths.

Once Master Routing Component 301 receives (at 310) the advertisement from data center 201-3 (e.g., from the element having the identifier "3456"), Master Routing Component 301 may update the information in data structure 401, to yield modified data structure 402. As shown, the paths between Source IP addresses in the "4.4.4.x" and "5.5.5.x" ranges and destination IP addresses in the "2.2.2.x" and "3.3.3.x" ranges may remain the same after receiving (at 310) the advertisement from data center 201-3. On the other hand, the paths between source IP addresses in the "4.4.4.x" and "5.5.5.x" ranges and destination IP addresses in the "1.1.1.x" range may have been modified, as compared to the information shown in data structure 401.

For example, instead of being associated with the path "11, 22, 1234," traffic between IP addresses in the "4.4.4.x" and "1.1.1.x" range may be associated with the path "11, 88, 99, 3456." Similarly, instead of being associated with the path "33, 44, 1234," traffic between IP addresses in the "5.5.5.x" and "1.1.1.x" range may be associated with the path "33, 3, 3456." For example, the paths between the "4.4.4.x" and "1.1.1.x" range may be the same as the paths between the "4.4.4.x" and "3.3.3.x" range, and the paths between the "5.5.5.x" and "1.1.1.x" range may be the same as the paths between the "5.5.5.x" and "3.3.3.x" range.

While one set of paths is shown in FIG. 4 between each pair of source/destination IP address ranges, in practice, multiple paths may be indicated. Further, while concepts are described above in terms of a static configuration or provisioning of "backup" IP address ranges, in some embodiments, the devices or systems used to implement backup functionality for a failed device or system (e.g., a failed data center 201, a failed CSCF 111, etc.) may be selected dynamically.

For example, returning to FIG. 3, in lieu of identifying (at 306) a backup data center associated with the failed IP address range, CSCF Selection Component 105 may dynamically determine a data center 201 or CSCF 111 to provide the functionality of the failed device or system. For example, CSCF Selection Component 105 may receive (e.g., from CSCF Availability Component 303) performance or load information associated with a set of candidate data centers 201 or CSCFs 111. CSCF Selection Component 105 may, for example, select a particular data center 201 based on performance metrics associated with data center 201 (e.g., a particular data center 201 that provides the lowest latency, highest throughput, etc. out of a set of candidate data centers 201). As another example, the information received from CSCF Availability Component 303 may indicate that a particular data center 201 is less loaded (e.g., in terms of processor load, memory load, network load, and/or load or capacity associated with some other resource or combination of resources) than other data centers 201. CSCF Selection Component 105 may thus notify (at 308) the selected data center 201 to advertise the IP address range provided by the failed data center 201.

In this manner, a failover from a failed CSCF 111 (e.g., associated with a failed data center 201) to a functioning CSCF 111 (e.g., associated with a functioning data center 201) may be performed seamlessly and without the involvement of UEs 101. For example, while some UEs 101 may be configured to automatically communicate with a secondary or tertiary CSCF 111 in the event of failure of a primary CSCF 111, other UEs 101 may require a restart or some other process, which may be perceptible or inconvenient to users of UE 101. The reassignment process in accordance with some embodiments (e.g., as described above) may obviate the need for a UE 101 to restart or reestablish communications with a secondary CSCF 111 using a different IP address.

Figure 5:
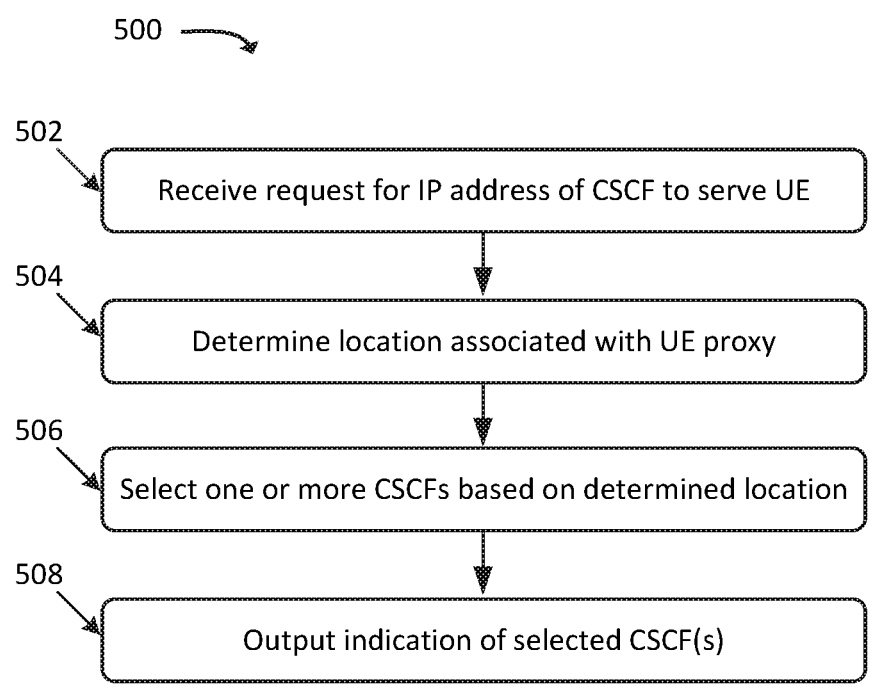
FIG. 5 illustrates an example process for assigning one or more CSCFs to serve a UE based on a location associated with a PGW that acts as a registration proxy for the UE.

FIG. 5 illustrates an example process 500 for assigning one or more CSCFs to serve a UE based on a location associated with a PGW that acts as a registration proxy for the UE. In some embodiments, some or all of process 500 may be performed by CSCF Selection Component 105. In some embodiments, one or more other devices may perform some or all of process 500 (e.g., in concert with, and/or in lieu of, CSCF Selection Component 105).

As shown, process 500 may include receiving (at 502) a request for an IP address of a CSCF to a particular UE 101. As discussed above, for example, CSCF Selection Component 105 may receive the request as a Diameter protocol message from PGW 103. The request may, in some embodiments, include the IP address or other identifier associated with PGW 103. In this manner, PGW 103 may be considered a "proxy" on behalf of UE 101.

Process 500 may further include determining (at 504) a location associated with the proxy associated with UE 101. For example, CSCF Selection Component 105 may determine a location associated with PGW 103, from which the request was received (at 502). For example, CSCF Selection Component 105 may identify, based on a mapping of PGW IP addresses (and/or other identifiers) to locations or regions, a location or region associated with PGW 103. As discussed above, the location of PGW 103 may correspond to a location or region in which UE 101 is located.

Process 500 may additionally include selecting (at 506) one or more CSCFs 111 to assign to UE 101. For example, CSCF Selection Component 105 may identify one or more data centers 201 that correspond to the identified location or region of PGW 103, and/or may individually identify one or more CSCFs 111 that are located within or proximate to the location or region of PGW 103. As described above, CSCF Selection Component 105 may select a set of CSCFs 111 for UE 101. The selection may include designating a particular CSCF 111 as a "primary" CSCF and one or more other CSCFs 111 as "secondary," "tertiary," "auxiliary," "supplemental," etc. CSCFs. In some embodiments, CSCF Selection Component 105 may obtain utilize a LLR selection technique, in which two "local" CSCFs 111 are selected as primary and secondary CSCFs (e.g., two CSCFs 111 that are associated with the same data center 201), and one "remote" CSCF 111 is selected as a tertiary CSCF (e.g., associated with a different data center 201 than the primary and secondary CSCFs 111).

Process 500 may also include outputting (at 508) an indication of the selected CSCF(s) 111. For example, as similarly described above, CSCF Selection Component 105 may output, to PGW 103 (e.g., using Diameter or some other suitable protocol) an indication of the IP address(es) of the selected CSCF(s) 111. As similarly discussed above, PGW 103 may notify UE 101 of the IP address(es), which may include outputting one or more messages to one or more other devices or systems (e.g., a MME, a SGW, etc.). As a result, UE 101 may utilize the IP addresses (e.g., the IP address of the primary CSCF 111) to communicate with one or more of the selected CSCFs 111, in order to receive services provided by CSCF(s) 111.

Figure 6:
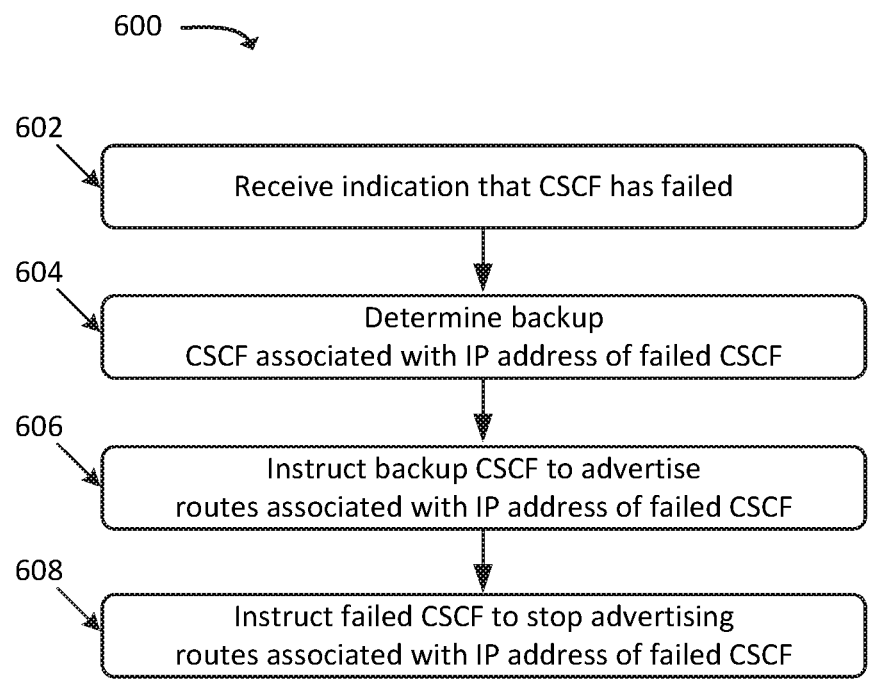
FIG. 6 illustrates an example process for reassigning an IP address, associated with a failed CSCF, to a functioning CSCF.

FIG. 6 illustrates an example process 600 for reassigning an IP address, associated with a failed CSCF, to a functioning CSCF. In some embodiments, some or all of process 600 may be performed by CSCF Selection Component 105. In some embodiments, one or more other devices may perform some or all of process 600 (e.g., in concert with, and/or in lieu of, CSCF Selection Component 105).

As shown, process 600 may include receiving (at 602) an indication that a particular CSCF 111 has failed. For example, as discussed above, the indication may be received from CSCF Availability Component 303 and/or some other device or system that determines performance and/or availability of CSCF 111. Additionally, or alternatively, as similarly discussed above, CSCF Selection Component 105 may receive an indication or otherwise determine that a particular data center 201, in which CSCF 111 is located, has failed. In some embodiments, the indication may include an ASN or IP address associated with failed CSCF 111. Additionally, or alternatively, CSCF Selection Component 105 may determine the ASN or IP address based on information maintained or received from Master Routing Component 301.

Process 600 may further include determining (at 604) a backup CSCF 111 associated with the IP address of failed CSCF 111. For example, as discussed above, CSCFs 111 may have been provisioned with, or otherwise assigned, backup IP addresses. Additionally, or alternatively, as discussed above, CSCF Selection Component 105 may dynamically select a particular CSCF 111 to serve as a backup for failed CSCF 111. For example, as discussed above, multiple CSCFs 111 may be assigned to one or more UEs 101 (e.g., including a primary, secondary, etc. CSCF 111). CSCF Selection Component 105 may identify another CSCF 111 from the same group as the failed CSCF 111 (e.g., may identify a secondary CSCF, in the event that failed CSCF 111 is a primary CSCF), and may determine that the other functioning CSCF 111 of the same group (e.g., a secondary CSCF) should be used. As another example, CSCF Selection Component 105 may select backup CSCF 111 based on load and/or performance information associated with a set of candidate CSCFs 111, from which backup CSCF 111 may be selected.

Process 600 may additionally include instructing (at 606) backup CSCF 111 to advertise routes associated with the IP address of failed CSCF 111. For example, CSCF Selection Component 105 may instruct selected backup CSCF 111 to advertise routes (e.g., according to BGP or some other suitable dynamic routing protocol) between a set of IP addresses (e.g., including an IP address of one or more UEs for which failed CSCF 111 was previously selected) and the IP address of failed CSCF 111 (i.e., the IP address being reassigned to functioning backup CSCF 111). As discussed above, the routes may be expressed in terms of ASNs or other suitable identifiers. Once backup CSCF 111 advertises the routes, the routes may be propagated (e.g., by a BGP route reflector and/or some other suitable component) to other elements that implement the dynamic routing technique, such as routers associated with a core network, an IMS network, etc., with which UE 101 communicates. In this manner, UE 101 may continue receiving services or other communications previously provided by failed CSCF 111 with minimal interruption of service, and with no signaling or messaging required from UE 101 to establish communications with backup CSCF 111.

Process 600 may further include instructing (at 608) failed CSCF 111 to stop advertising routes associated with the IP address of failed CSCF 111. As discussed above, in the event that failed CSCF 111 is unreachable, CSCF Selection Component 105 and/or some other device or system may cache the instruction such that failed CSCF 111 receives the instruction when CSCF 111 becomes available.

Figure 7:
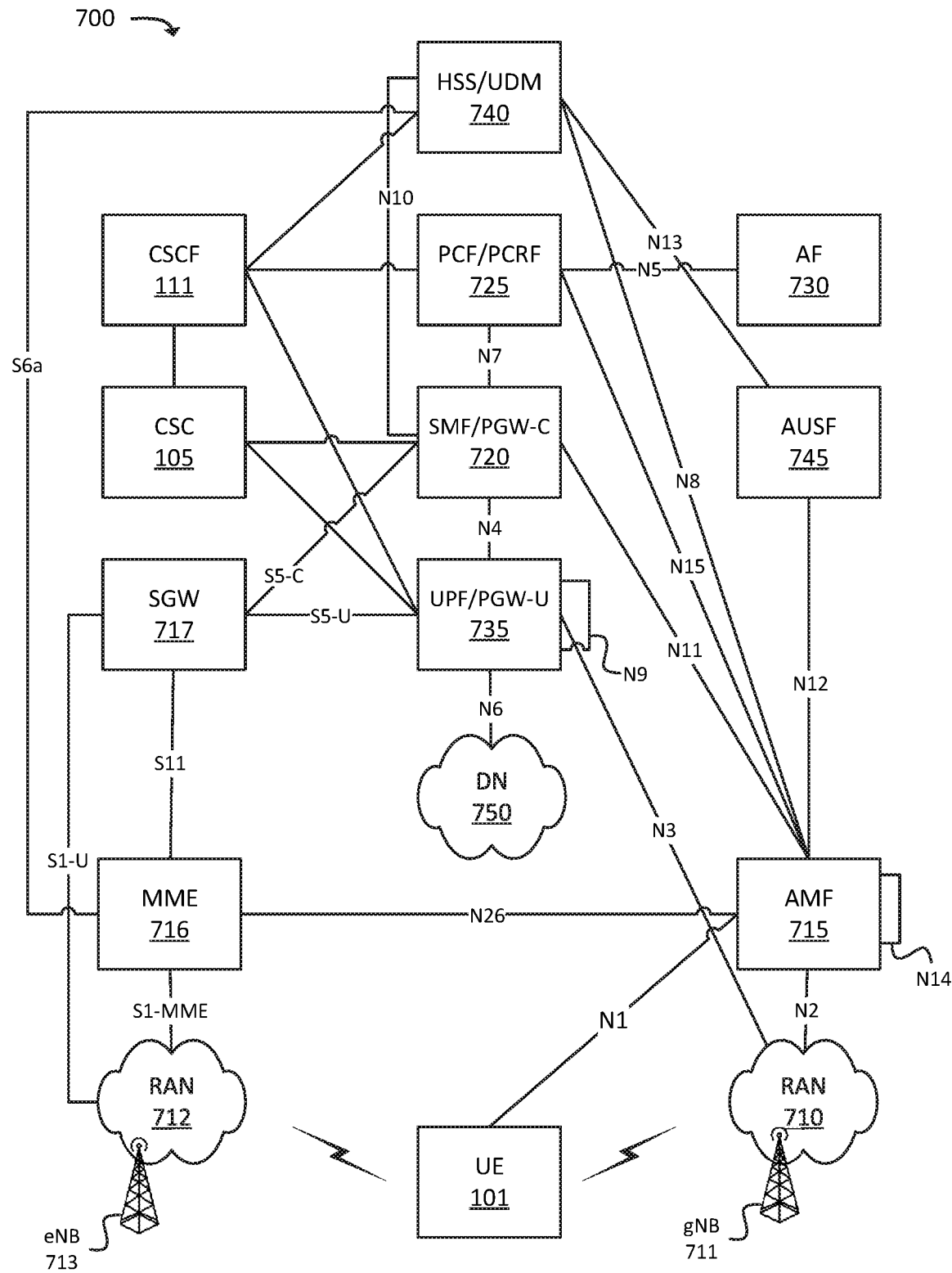
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an EPC). As shown, environment 700 may include UE 101, RAN 710 (which may include one or more Next Generation Node Bs ("gNBs") 711), RAN 712 (which may include one or more one or more eNBs 713), AMF 715, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, Authentication Server Function ("AUSF") 745, CSCF 111, CSCF Selection Component 105 (abbreviated in the figure as "CSC" 105), and Data Network ("DN") 750. In some embodiments, PGW-U 735 and PGW-C 720 may correspond to a Control and User Plane Separation ("CUPS") architecture.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. For example, these routers, modems, gateways, etc., may implement a dynamic routing technique (such as BGP or some other suitable routing technique). These elements (e.g., routers, modems, gateways, etc.) may be associated with a unique identifier associated with the dynamic routing technique (e.g., an ASN). Each element may, according to the dynamic routing technique, calculate or determine paths between itself and one or more other devices or systems. For example, each router that implements the dynamic routing technique may calculate or determine a path between an IP address associated with UE 101 and itself. In some embodiments, as similarly discussed above, the paths may be expressed in terms of identifiers associated with the dynamic routing technique (e.g., BGP).

In some embodiments, one or more of the devices of environment 700 may perform one or more functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 101 may include a computation and communication device, such as a wireless mobile communication device that is capable of communicating with RAN 710 and/or DN 750. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 101 may send traffic to and/or receive traffic (e.g., user plane traffic) from DN 750 via RAN 710 and UPF/PGW-U 735.

RAN 710 may be, or may include, a 5G RAN that includes one or more base stations (e.g., one or more gNBs 711), via which UE 101 may communicate with one or more other elements of environment 700. UE 101 may communicate with RAN 710 via an air interface (e.g., as provided by gNB 711). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, AMF 715, and/or one or more other devices or networks) and may communicate the traffic to UE 101 via the air interface.

RAN 712 may be, or may include, an LTE RAN that includes one or more base stations (e.g., one or more eNBs 713), via which UE 101 may communicate with one or more other elements of environment 700. UE 101 may communicate with RAN 712 via an air interface (e.g., as provided by eNB 713). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, SGW 717, and/or one or more other devices or networks) and may communicate the traffic to UE 101 via the air interface.

AMF 715 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, and/or to perform other operations. In some embodiments, the 5G network may include multiple AMFs 715, which communicate with each other via the N14 interface (denoted in FIG. 7 by the line marked "N14" originating and terminating at AMF 715).

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 101. In some embodiments, the establishment of communications sessions may be performed in accordance with one or more policies provided by PCF/PCRF 725. In some embodiments, some of the operations described above with respect to PGW 103 may be performed by PGW-C 720 (e.g., acting as a proxy for registration with CSCF 111, on behalf of UE 101).

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 101, from DN 750, and may forward the user plane data toward UE 101 (e.g., via RAN 710, SMF/PGW-C 720, and/or one or more other devices). In some embodiments, multiple UPFs 735 may be deployed (e.g., in different geographical locations), and the delivery of content to UE 101 may be coordinated via the N9 interface (e.g., as denoted in FIG. 7 by the line marked "N9" originating and terminating at UPF/PGW-U 735). Similarly, UPF/PGW-U 735 may receive traffic from UE 101 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 101.

DN 750 may include one or more wired and/or wireless networks. For example, DN 750 may include an IP-based PDN, a wide area network ("WAN") such as the Internet, a private enterprise network, and/or one or more other networks. UE 101 may communicate, through DN 750, with data servers, other UEs 101, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 101 may communicate.

CSCF 111 may include one or more devices, systems, VNFs, etc., that gather, process, search, store, and/or provide information in a manner described herein. CSCF 111 may process and/or route messages, calls, etc. to and/or from UE 101 via the EPC. For example, CSCF 111 may process messages or calls, received from an external network, that are destined for UE 101. In another example, CSCF 111 may process messages and/or calls, received from UE 101, that are destined for the external network. CSCF 111 may be part of an IMS network that includes multiple CSCFs 111 (e.g., geographically distributed CSCFs 111, which may be located in, or otherwise associated with, different data centers 201). As mentioned above, a "data center" may include a physical facility, and/or may refer to a particular set of devices. In some embodiments, different data centers may be defined in terms of different ASNs or other identifiers used in a dynamic routing technique (e.g., BGP). While not explicitly shown in FIG. 7, the term "CSCF" may refer to a set of CSCFs, including an Interrogating CSCF ("I-CSCF"), a Serving CSCF ("S-CSCF"), and/or a Proxy CSCF ("P-CSCF").

CSCF Selection Component 105 may include one or more devices, systems, VNFs, etc., that perform one or more functions described herein. For example, as discussed above, CSCF Selection Component 105 may identify CSCFs 111 and/or other devices that have failed and/or which do not meet a threshold performance, and may effect a seamless failover to a functioning CSCF 111 (or other device). For example, as described herein, may select a functioning CSCF 111 to handle the services provided by the failed CSCF 111, and may cause the functioning CSCF 111 to advertise routes associated with the functioning CSCF 111 and an IP address previously associated with the failed CSCF 111. In this manner, the routes may be propagated in accordance with the dynamic routing technique (e.g., by a BGP route reflector or some other suitable device or system).

Figure 8:
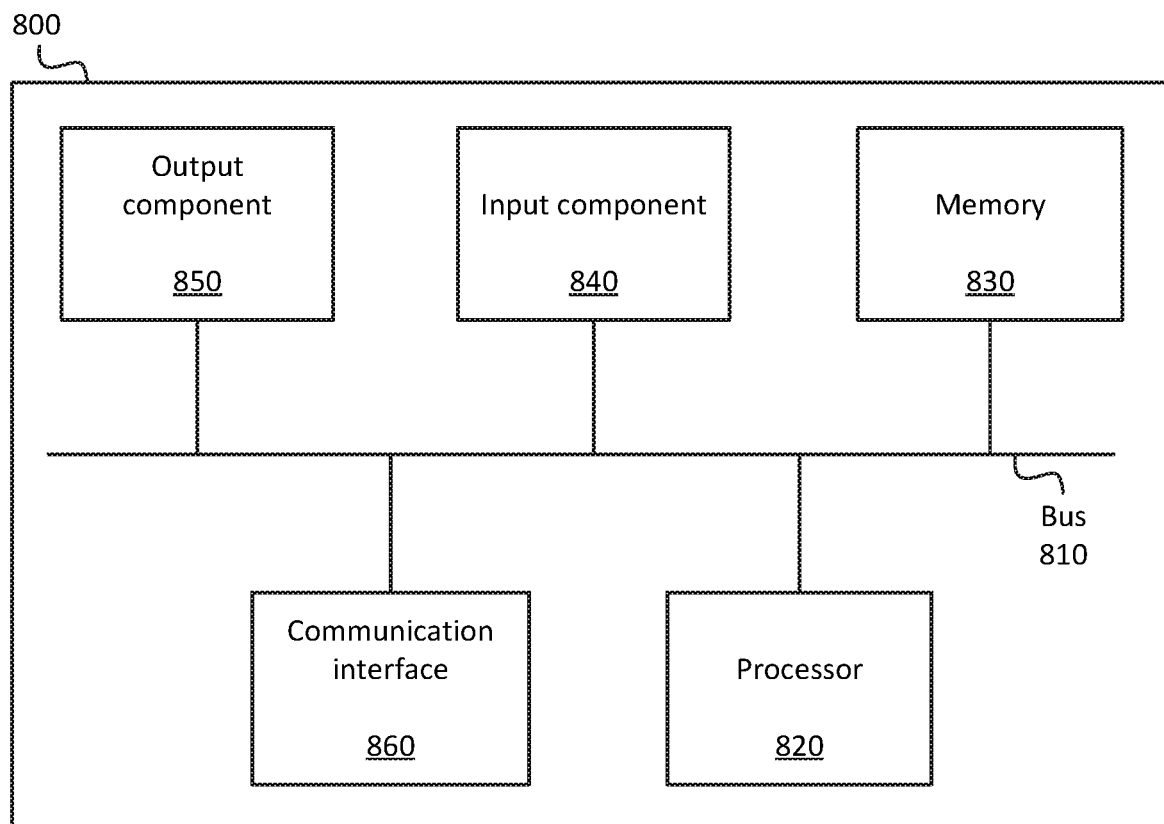
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

As another example, while described in the context of CSCFs, in practice, similar concepts may apply to other types of devices that utilize IP-based messaging. For example, a set of VNFs, cloud computing systems, edge computing systems (e.g., Mobile/Multi-Access Edge Computing ("MEC") systems), etc. may provide similar or identical functionality, and the failure of one may invoke a failover process similar to embodiments described above. For example, a first cloud computing system may provide services to a UE via IP-based messaging. If the first cloud computing system fails, some embodiments may identify a second cloud computing system as a backup, and may instruct the second cloud computing system to advertise paths or routes associated with an IP address previously used by the failed cloud computing system. In this manner, the IP address previously associated with the failed first cloud computing system may be associated with the second cloud computing system (e.g., utilizing BGP or some other suitable dynamic routing technique).

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving a request to establish a communication session from a User Equipment (UE) that is associated with a UE IP address;
assigning, based on the request to establish the communication session, a first Call Session Control Function (CSCF) to the UE, the first CSCF associated with a CSCF IP address, wherein one or more network devices route network traffic, destined for the CSCF IP address and sent from the UE IP address, to the first CSCF based on the assignment of the first CSCF to the UE;
determining, after assigning the first CSCF to the UE, that a performance metric associated with the first CSCF does not meet a threshold performance metric;
selecting a second CSCF to which the UE should be assigned;
based on determining that the performance metric associated with the first CSCF does not meet the threshold performance metric, causing network traffic destined for the CSCF IP address to be routed to the second CSCF in lieu of the first CSCF, the causing including outputting at least one path to the one or more network devices to cause the one or more network devices to route network traffic destined for the CSCF IP address toward the second CSCF in lieu of the first CSCF, wherein the at least one path includes at least one path between the UE IP address and the CSCF IP address that includes at least one of the one or more network devices.

2. The method of claim 1, wherein outputting the at least one path includes outputting a Border Gateway Protocol ("BGP") advertisement including the at least one path to a BGP route reflector.

3. The method of claim 1, wherein the second CSCF is selected prior to determining that the performance metric associated with the first CSCF does not meet the threshold performance metric.

4. The method of claim 1, further comprising:
receiving a first Session Initiation Protocol ("SIP") message from the UE prior to determining that the performance metric associated with the first CSCF does not meet the threshold performance metric;
routing the first SIP message to the first CSCF;
receiving a second SIP message from the UE after determining that the performance metric associated with the first CSCF does not meet the threshold performance metric; and
routing the second SIP message to the second CSCF.

5. The method of claim 1, wherein the at least one path includes a plurality of paths between a plurality of different IP addresses and the CSCF IP address.

6. The method of claim 1, wherein the first CSCF and the second CSCF are included in a plurality of CSCFs that are associated with a particular geographical region, and wherein selecting the second CSCF includes selecting the second CSCF from the plurality of CSCFs that are associated with the particular geographical region.

7. The method of claim 1, wherein the first CSCF is associated with a first data center and the second CSCF is associated with a second data center, and wherein outputting the at least one path includes instructing, the second data center to output at least one path associated with the CSCF IP address.

8. A system, comprising:
one or more processors configured to:
receive a request to establish a communication session from a User Equipment (UE) that is associated with a UE IP address;
assign, based on the request to establish the communication session, a first Call Session Control Function (CSCF) to the UE, the first CSCF associated with a CSCF IP address, wherein one or more network devices route network traffic, destined for the CSCF IP address and sent from the UE IP address, to the first CSCF based on the assignment of the first CSCF to the UE;
determine, after assigning the first CSCF to the UE, that a performance metric associated with the first CSCF does not meet a threshold performance metric;
select a second CSCF to which the UE should be assigned;
based on determining that the performance metric associated with the first CSCF does not meet the threshold performance metric, cause network traffic destined for the CSCF IP address to be routed to the second CSCF in lieu of the first CSCF, the causing including outputting at least one path to the one or more network devices to cause the one or more network devices to route network traffic destined for the CSCF IP address toward the second CSCF in lieu of the first CSCF, wherein the at least one path includes at least one path between the UE IP address and the CSCF IP address that includes at least one of the one or more network devices.

9. The system of claim 8, wherein outputting the at least one path includes outputting a Border Gateway Protocol ("BGP") advertisement including the at least one path to a BGP route reflector.

10. The system of claim 8, wherein the second CSCF is selected prior to determining that the performance metric associated with the first CSCF does not meet the threshold performance metric.

11. The system of claim 8, wherein the one or more processors are further configured to:
receive a first Session Initiation Protocol ("SIP") message directed to the CSCF IP address from the UE prior to determining that the performance metric associated with the first CSCF does not meet the threshold performance metric;
route the first SIP message to the first CSCF;
receive a second SIP message directed to the CSCF IP address from the UE after determining that the performance metric associated with the first CSCF does not meet the threshold performance metric; and
route the second SIP message to the second CSCF.

12. The system of claim 8, wherein the at least one path include a plurality of paths between a plurality of different IP addresses and the CSCF IP address.

13. The system of claim 8, wherein the first CSCF and the second CSCF are included in a plurality of CSCFs that are associated with a particular geographical region, and wherein selecting the second CSCF includes selecting the second CSCF from the plurality of CSCFs that are associated with the particular geographical region.

14. The system of claim 8, wherein the first CSCF is associated with a first data center and the second CSCF is associated with a second data center, and wherein outputting the at least one path includes instructing the second data center to output at least one path associated with the CSCF IP address.

15. A system to provide network service to a User Equipment (UE) having a UE IP address, comprising:
- a first network function data center including a first network function associated with a first network function IP address;
- a second network function data center including a second network function associated with a second network function IP address different than the first network function IP address;
- a number of routers implementing Border Gateway Protocol (BGP), the number of routers configured to route network traffic between the UE, the first network function data center and the second network function data center; and
- a function selector in communication with the first network function data center and the second network function data center and configured to assign the first network function to the UE;
- wherein the function selector is further configured to send an instruction to the second network function data center to advertise at least one route to the first network function IP address when the function selector determines that a performance metric associated with the first network function does not meet a threshold performance metric, the at least one route including a route from the UE IP address to the first network function IP address that includes the second network function data center, and
- wherein the second network function data center sends an advertisement to the number of routers including the at least one route after receiving the instruction from the function selector.

16. The system of claim 15, wherein the function selector is further configured to send an instruction to the first network function data center to stop advertising routes to the first network function IP address when the function selector determines that the performance metric associated with the first network function does not meet the threshold performance metric.

17. The system of claim 15, wherein the function selector is further configured to assign the second network function to the UE prior to determining that the performance metric associated with the first network function does not meet the threshold performance metric.

18. The system of claim 15, further comprising a BGP route reflector in communication with the second network function data center and the number of routers, and wherein the BGP route reflector receives the advertisement from the second network function data center and sends the advertisement to the number of routers.

19. The system of claim 15, wherein the function selector assigns the first network function to the UE based on a location of the first network function data center.

20. The system of claim 15, wherein the first network function and the second network function are each a Call Session Control Function (CSCF).

* * * * *